United States Patent Office 3,495,747
Patented Feb. 17, 1970

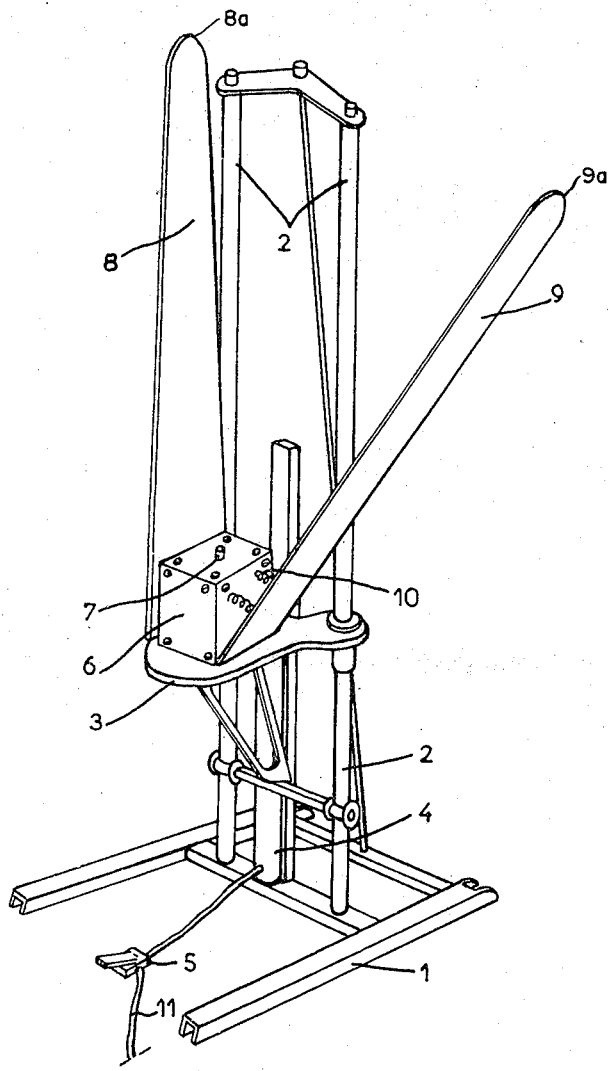

3,495,747
DEVICE FOR INSPECTING KNITTED ARTICLES, ESPECIALLY SKIN-TIGHT GARMENTS, AFTER MANUFACTURING
Joseph Pepo Saltiel, Saint-Quentin, France, assignor to Wimbledon Organizion Ltd., Luxembourg, Luxembourg, a company of Luxembourg
Filed Dec. 11, 1968, Ser. No. 782,803
Claims priority, application France, Dec. 15, 1967, 132,442
Int. Cl. D06c 15/00
U.S. Cl. 223—72    3 Claims

ABSTRACT OF THE DISCLOSURE

Device for inspecting knitted articles, in particular skin-tight garments, after manufacture, comprising at least one inspection form the configuration of which corresponds to the general configuration of the article to be inspected and which is rotatably mounted on a movable support member so as to display successively all the faces of the said article for inspection by an operator, and drive means for imparting a reciprocating motion to the support member in order to facilitate slipping of the article onto the inspection form and, also, its removal from the said form.

---

The present invention relates essentially to a device enabling one to readily and rapidly effect a complete and close inspection of finished knitted articles, for instance skin-tight garments or the like.

Knitted articles, especially delicate and relatively expensive ones, usually undergo a quality inspection subsequent to manufacture and prior to packing in order to discard defective articles.

Such an inspection is relatively difficult and slow when performed manually, since it requires every portion of an article to be spread so as to enable one critically to examine the stitches of the knitted wear and to check the quality of the seams. In particular, when the articles to be inspected consist of skin-tight garments, it is hardly practical and rather time-consuming to successively examine the feet and then the whole periphery of the leg-forming portions and, finally, the body portion.

The device according to the invention is designed to avoid these inconveniences and is remarkable in particular in that it is comprised of a support member, at least one inspection form shaped having the general configuration of the article to be inspected and rotatably mounted on the said movable support member to successively display the faces thereof for inspection by an operator, and drive means for imparting to the said support member a reciprocating motion to facilitate the slipping of the article onto the said form and its removal therefrom.

According to another feature of the invention, the inspection form is constituted by a turning block or the like rotatably mounted on an axis rigid with the support member and by two inspection legs mounted on the said turning block.

The invention will be better understood and further objects, characteristics, details and advantages thereof will appear as the following explanatory description proceeds with reference to the accompanying diagrammatic drawing in which the single figure given by way of example only, illustrates one embodiment of the invention and shows in perspective a device embodying the invention for inspecting skin-tight garments or like articles.

In the embodiment illustrated, the device comprises a support frame 1 on which are mounted guide members comprising of two vertical and parallel tubular members 2. A support member comprising a bracket 3 is slidably mounted on the tubular members 2 and is rigid with the piston rod of a fluid-actuated cylinder 4 controlled by a compressed-air inlet valve actuated as by means of a pedal 5 and forming part of a compressed-air system 11.

On the bracket 3 is mounted an inspection form comprising a cube-shaped turning block 6 mounted so as to be freely rotated on a vertical axis 7 rigid with the bracket 3 and carrying two inspection legs 8 and 9. Each inspection leg comprises an elongated plate or the like the side edges of which converge and which respectively are connected with one another at the free end of the plate by a rounded outer end portion 8a and 9a respectively.

The inspection leg 8 is fixed at its bottom end to one of the faces of the turning block, whereas the bottom of the inspection leg 9 is hingedly assembled with the lower edge of the opposite face of the turning block. Springs 10 are provided to keep the inspection leg 9 applied to the face of the turning block on which the said leg is hingedly mounted.

The device according to the invention operates as follows.

With the movable assembly comprising the bracket 3, the turning block 6 and the inspection legs 8 and 9 set to its lower position, the operator takes hold of a skin-tight garment by the waistband thereof and places the opened waistband over the rounded ends 8a and 9a of the inspection legs 8 and 9.

It is then sufficient for the operator to depress the pedal 5 with his foot to feed the cylinder 4 and thus cause the said movable assembly to slide upwards on guides 2. This upward motion towards the top of the form which, in case of need, may be accompanied by a downward motion of the operator's arms, is sufficient to readily and rapidly slip the legs of the skin-tight garment on the inspection legs 8 and 9 and pass the body portion of the garment over the turning block 6.

The pedal 5 is then released to move the movable assembly back to its initial or lower position, whereat the operator can thoroughly examine the article by rotating the assembly bearing the mounted garment on the axis 7.

In order to conveniently examine the inner faces of the legs and the crotch portion of the skin-tight garment and, more particularly, to check the strength and quality of the seams at those locations, the operator swings the inspection leg 9 on its hinged joint with block 6 from its initial position to place it in the inclined positon shown in the drawing. When the inspection leg 9 is released, it is immediately returned to its initial positon under the action of two return-springs 10.

When the inspection is finished, the operator again presses the pedal 5 so as to raise the movable assembly to its upper position. It is then sufficient to take hold of the waistband of the garment with both hands and simultaneously release the pedal 5 to lower the movable assembly and thus completely withdraw it from the forms or legs 8 and 9 and block 10 on which it was slipped for inspection purposes The inspection assembly on which the article or garment is slipped may have any other suitable configuration other than that illustrated. Several forms may also be provided on a common support member. Moreover, both inspection legs may be stationary with respect to the turning block or, alternatively, they may both be hingedly mounted.

Instead of being vertical the guide members may be horizontal or inclined. The reciprocating motion of the movable assembly may also be obtained otherwise than by sliding, e.g. by the pivoting of an arm or lever at the end of which the said movable assembly may be arranged. Lastly, any convenient means may be used to impart motion to the movable assembly.

It is to be understood that the invention should not at all be construed as being limited to the forms of embodiment shown and described, as the latter have been given by way of example only. In particular, the invention comprises all the means constituting technical equivalents to the means described as well as their combinations, enabling one to carry out the spirit, principles and teachings of the invention.

What is claimed is:

1. A device for inspecting hosiery articles, comprising a stationary frame, straight guide means supported on said stationary frame, a movable support slidingly mounted on said guiding means, driving means for imparting to said movable support a reciprocating motion, a block member carried on said support, said block member being rotatably movable relative to said support about an axis parallel to said guide means and at least two elongated forms on said block member, one at least of said forms being movable between an extended position for which it is inclined relative to the other form and a retracted position in which it is parallel to said other form.

2. A device according to claim 1 wherein spring means are provided on said block member for resiliently urging said form to said retracted position.

3. A device according to claim 1, wherein said movable support is provided with a spindle extending in a parallel direction with said guide means, said block member being mounted on said spindle for free rotary movement thereabout.

References Cited

UNITED STATES PATENTS

| | | | |
|---|---|---|---|
| 2,516,054 | 7/1950 | Forse et al. | 223—73 |
| 3,103,302 | 9/1963 | Minton | 223—39 |
| 3,349,976 | 10/1967 | Lew | 223—73 |

MERVIN STEIN, Primary Examiner

G. V. LARKIN, Assistant Examiner